United States Patent
Ito et al.

(10) Patent No.: US 10,207,442 B2
(45) Date of Patent: Feb. 19, 2019

(54) CONTINUOUS EXTRUSION FORMING APPARATUS

(71) Applicant: NGK Insulators, Ltd., Nagoya-Shi (JP)

(72) Inventors: Eiji Ito, Yokkaichi (JP); Yuji Ueda, Nagoya (JP); Yuichi Tajima, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 544 days.

(21) Appl. No.: 14/834,618

(22) Filed: Aug. 25, 2015

(65) Prior Publication Data

US 2015/0360407 A1    Dec. 17, 2015

Related U.S. Application Data

(63) Continuation of application No. PCT/JP2014/057238, filed on Mar. 18, 2014.

(30) Foreign Application Priority Data

Mar. 21, 2013 (JP) .................. 2013-058204

(51) Int. Cl.
*B29C 47/08* (2006.01)
*B29C 47/00* (2006.01)
(Continued)

(52) U.S. Cl.
CPC .......... *B29C 47/0028* (2013.01); *B28B 3/269* (2013.01); *B28B 17/009* (2013.01);
(Continued)

(58) Field of Classification Search
CPC ............. B29C 47/0811; B29C 47/0816; B29C 47/0822; B29C 47/0828; B29C 47/0883; B29C 47/28
See application file for complete search history.

(56) References Cited

U.S. PATENT DOCUMENTS 2,642,898 A * 6/1953 Acock .................. B29C 47/021
    138/131
2,834,047 A * 5/1958 Morin ..................... B29C 47/24
    226/162
(Continued)

FOREIGN PATENT DOCUMENTS

DE    28 54 523 A1    6/1980
JP      S47-8940      3/1972
(Continued)

OTHER PUBLICATIONS

Japanese Office Action (with English Translation), Japanese Application No. 2015-506788, dated Aug. 29, 2017 (6 pages).
(Continued)

*Primary Examiner* — Yogendra N Gupta
*Assistant Examiner* — Joseph S Leyson
(74) *Attorney, Agent, or Firm* — Burr & Brown, PLLC

(57) ABSTRACT

An apparatus of the present invention is a continuous extrusion forming apparatus comprising: a screw which carries a forming raw material in the horizontal direction, the screw being built in the screw part; and a mouth piece structure for extrusion forming, which is provided on the downstream side of a screw part, wherein the mouth piece structure has a horizontal channel for extruding the forming raw material flowing in from the screw part in the horizontal direction, an extrusion channel orthogonal to the horizontal channel, and an extrusion port provided at a tip end of the extrusion channel, and wherein a mouth piece structure holder which holds the mouth piece structure is provided with a turning means which freely changes the opening direction of the extrusion port between the horizontal direction and a floor facing direction.

4 Claims, 5 Drawing Sheets

(51) Int. Cl.
  *B29C 47/28* (2006.01)
  *B29C 47/12* (2006.01)
  *B29C 47/38* (2006.01)
  *B28B 3/26* (2006.01)
  *B28B 17/00* (2006.01)
(52) U.S. Cl.
  CPC ...... *B29C 47/0811* (2013.01); *B29C 47/0816* (2013.01); *B29C 47/0822* (2013.01); *B29C 47/0828* (2013.01); *B29C 47/0838* (2013.01); *B29C 47/0883* (2013.01); *B29C 47/122* (2013.01); *B29C 47/126* (2013.01); *B29C 47/28* (2013.01); *B29C 47/38* (2013.01); *B29C 47/12* (2013.01)

(56) References Cited

U.S. PATENT DOCUMENTS

| 4,178,145 A | 12/1979 | Hamamoto et al. |
| 4,935,179 A | 6/1990 | Kato et al. |
| 2004/0194427 A1 | 10/2004 | Ishii et al. |
| 2010/0244308 A1 | 9/2010 | Yamazaki |

FOREIGN PATENT DOCUMENTS

| JP | S54-011168 A | 1/1979 |
| JP | 62-130803 A1 | 6/1987 |
| JP | 63-230304 A1 | 9/1988 |
| JP | 2003-311726 A1 | 11/2003 |
| JP | 2004-249513 A1 | 9/2004 |
| JP | 2010-105165 A | 5/2010 |
| JP | 2010-221637 A1 | 10/2010 |

OTHER PUBLICATIONS

Extended European Search Report (Application No. 14769711.4) dated Mar. 23, 2017.
International Search Report and Written Opinion (Application No. PCT/JP2014/057238) dated Jun. 10, 2014 (with English translation).

* cited by examiner

CONTINUOUS EXTRUSION FORMING APPARATUS

BACKGROUND OF THE INVENTION

Technical Field of the Invention

The present invention relates to a continuous extrusion forming apparatus.

Description of Related Art

Known techniques for forming a honeycomb structure include a method of continuously extrusion-forming a honeycomb structure using a continuous extrusion forming apparatus (for example, Patent Document 1) and a method using an extrusion forming apparatus referred to as so-called "ram type".

By the method using the continuous extrusion forming apparatus, it is possible to rotate a twin screw which is installed in a drum while continuously feeding a raw material into the drum, carry the raw material while kneading the material in the drum, and continuously extrude the forming raw material from a mouth piece structure which is provided at the end of the drum. On the other hand, the method using a "ram type" extrusion forming apparatus comprises loading a preliminarily-kneaded forming raw material into a cylinder, and pressurizing the raw material by a piston for extrusion forming, and thus requires loading of the forming raw material into the cylinder again after completely pushing the piston to the stroke end of the cylinder, and has the disadvantage that a seam portion of the forming raw material cannot be used as products, leading to a raw material loss.

Since it is difficult to vertically arrange the twin screw, the existing continuous extrusion forming apparatuses exclusively have a structure of carrying a forming raw material in the horizontal direction while kneading the material with a horizontally-arranged twin screw to extrude the raw material in the carrying direction. At present, a "ram type" extrusion forming apparatus is used when the forming raw material need to be extruded vertically downward.

Specifically, "ram type" extrusion forming apparatuses are used in the production of structures which deform due to their own weight upon horizontal extrusion forming (for example, a honeycomb structure having a large diameter). However, such extrusion forming apparatuses involve the following problem. That is, as the structure is larger in size, the number of structures which can be produced upon single loading of the forming raw material decreases while the frequency of loading of the forming raw material increases. When the frequency of loading of the forming raw material increases, the influence of the "raw material loss in the seam portions of the forming raw material" as described above becomes more seriously unfavorable on the production efficiency.

CITATIONS LIST

Patent Document

Patent Document 1: JP-A-2010-221637

SUMMARY OF INVENTION

Technical Problems

An object of the present invention is to provide a technique which solves the above problem and enables to extrusion-form, without deformation, a structure which deforms due to its own weight upon horizontal extrusion forming and to avoid the occurrence of a raw material loss resulting from extrusion forming.

Solutions to Problems

The continuous extrusion forming apparatus according to a first aspect of the present invention made in order to solve the above problem comprises: a screw which carries a forming raw material in the horizontal direction, the screw being built in the screw part; and a mouth piece structure for extrusion forming, which is provided on the downstream side of a screw part, wherein the mouth piece structure has a horizontal channel for extruding the forming raw material flowing in from the screw part in the horizontal direction, an extrusion channel orthogonal to the horizontal channel, and an extrusion port provided at a tip end of the extrusion channel, and wherein a mouth piece structure holder which holds the mouth piece structure is provided with a turning means which freely changes the opening direction of the extrusion port between the horizontal direction and a floor facing direction.

The continuous extrusion forming apparatus according to a second aspect of the present invention is the apparatus according to the first aspect of the present invention, wherein the mouth piece structure is provided with a pressure releasing device as a means for reducing the internal pressure of a mouth piece structure upstream part before the turning operation.

The continuous extrusion forming apparatus according to a third aspect of the present invention is the apparatus according to the second aspect of the present invention, wherein the pressure releasing device is arranged on the extended line of the horizontal channel.

The continuous extrusion forming apparatus according to a fourth aspect of the present invention is a method for producing a honeycomb structure using the continuous extrusion forming apparatus according to the first aspect of the present invention, wherein the forming raw material is extruded in a state where the opening direction of the extrusion port is oriented vertically downward, and wherein the changing operation of the mouth piece structure is carried out in a state where the opening direction of the extrusion port is the horizontal direction.

Advantageous Effects of Invention

The continuous extrusion forming apparatus according to the present invention comprises: a screw which carries a forming raw material in the horizontal direction, the screw being built in the screw part; and a mouth piece structure for extrusion forming, which is provided on the downstream side of a screw part, and is configured in such a manner that: the mouth piece structure has a horizontal channel for extruding the forming raw material flowing in from the screw part in the horizontal direction, an extrusion channel orthogonal to the horizontal channel, and an extrusion port provided at a tip end of the extrusion channel, and further a mouth piece structure holder which holds this mouth piece structure is provided with a turning means which freely changes the opening direction of the extrusion port between the horizontal direction and a floor surface direction. Therefore, when a structure which deforms due to its own weight upon horizontal extrusion forming is formed, vertical downward extrusion can be carried out while the opening direction of the extrusion port is the floor facing direction. Also, the present invention is intended for continuous extrusion forming, and thus can avoid the problem of "a raw material loss in seams of the forming raw material" as is caused when "ram type" extrusion forming apparatuses are used. That is, the present invention enables to extrusion-form a structure, without deformation, which deforms due to its own weight upon horizontal extrusion forming and to avoid the occurrence of a raw material loss resulting from extrusion forming.

The mouth piece structure of the continuous extrusion forming apparatus needs a periodical changing operation. In a state where the opening direction of the extrusion port is the floor facing direction as described above, an operator must conduct a changing operation upward, resulting in bad operability. Further, the mouth piece structure for large products has a weight of about 600 kg including attachment jigs, and thus operations carried out under the structure are dangerous. In the present invention, the mouth piece structure holder which holds the mouth piece structure is provided with a turning means which freely changes the opening direction of the extrusion port between the horizontal direction and the floor facing direction. Therefore, during the changing operation of the mouth piece structure, the opening direction of the extrusion port is turned to the horizontal direction so that the operation can be completed from the lateral direction safely and rapidly.

Since the pressure within the mouth piece structure during extrusion forming is high, specifically, 10 MPa or more, the turning operation of the mouth piece structure must be carried out after the reduction of the pressure within the mouth piece structure. A pressure releasing device is provided, in the mouth piece structure, as a means for reducing the internal pressure of the mouth piece structure before the turning operation as in the invention according to claim 2, thereby enabling to reduce the internal pressure easily.

The pressure releasing device is arranged on the extended line of the horizontal channel as in the invention according to claim 3, thereby making it possible to further reduce the internal pressure effectively.

DETAILED DESCRIPTION OF EMBODIMENTS

Hereinafter, a preferred embodiment of the present invention will be described.

Figure 1:
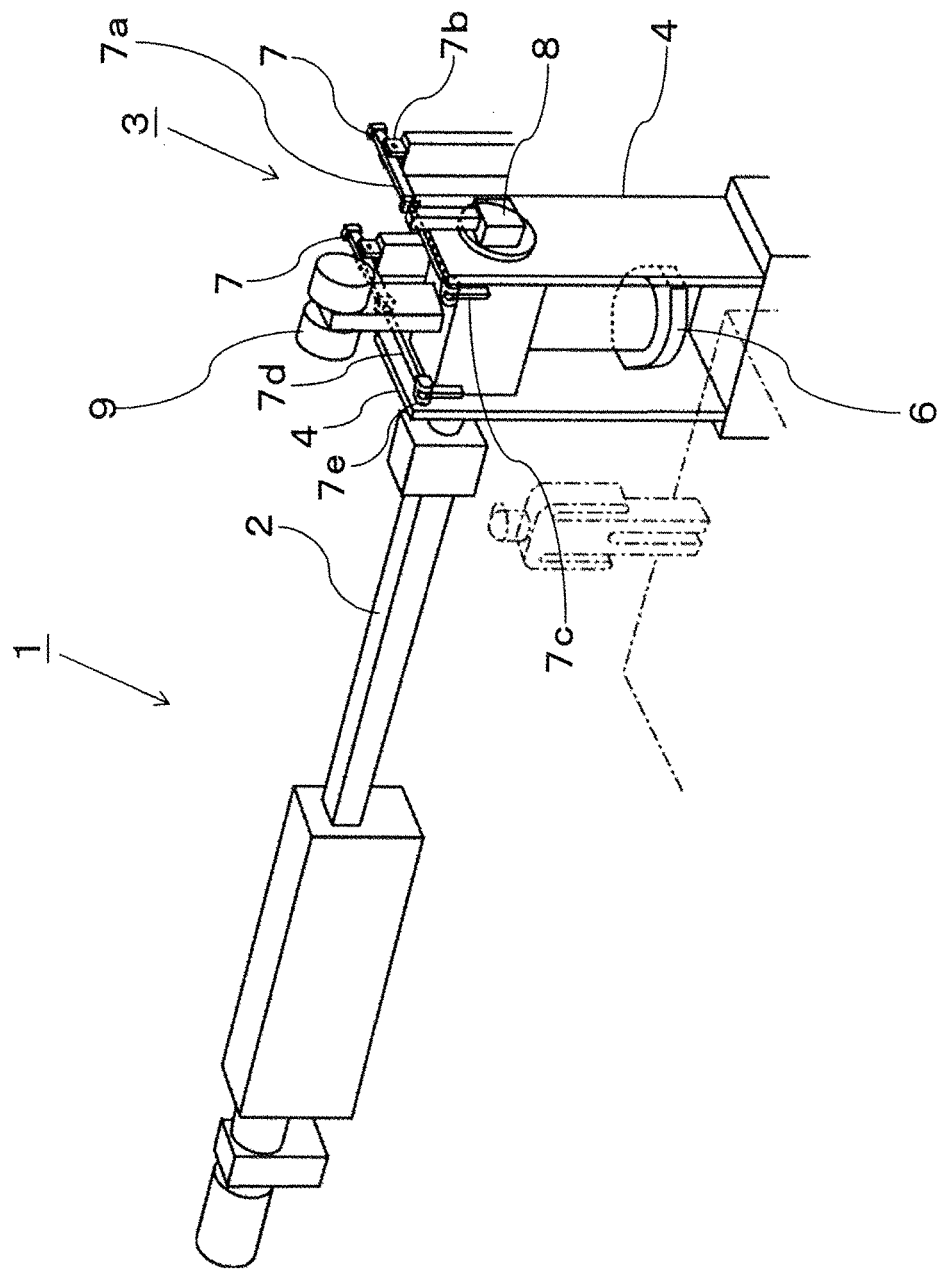
FIG. 1 is an overall perspective view of a continuous extrusion forming apparatus during extrusion forming.
Figure 2:
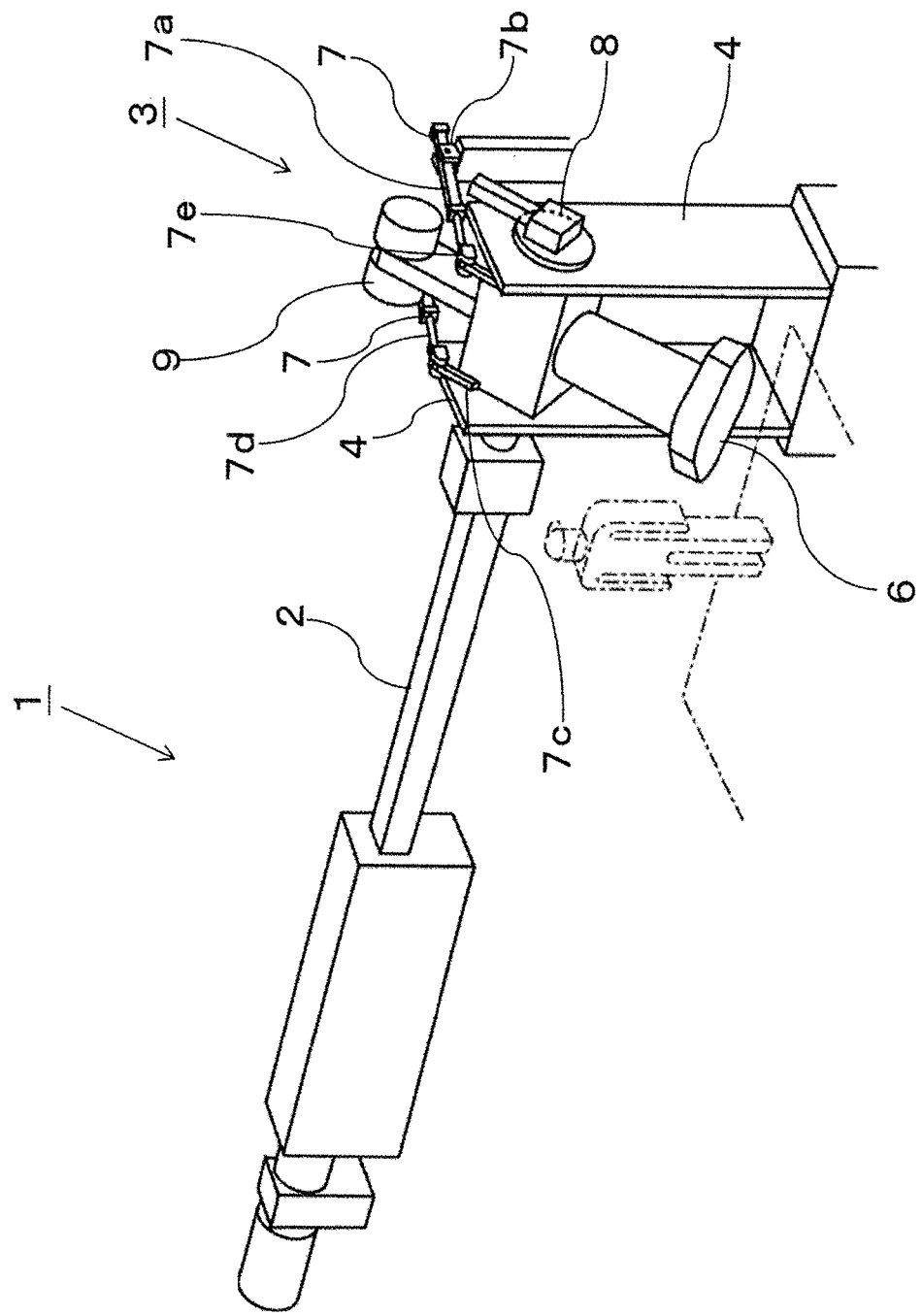
FIG. 2 is an overall perspective view of the continuous extrusion forming apparatus during turning of a mouth piece structure.
Figure 3:
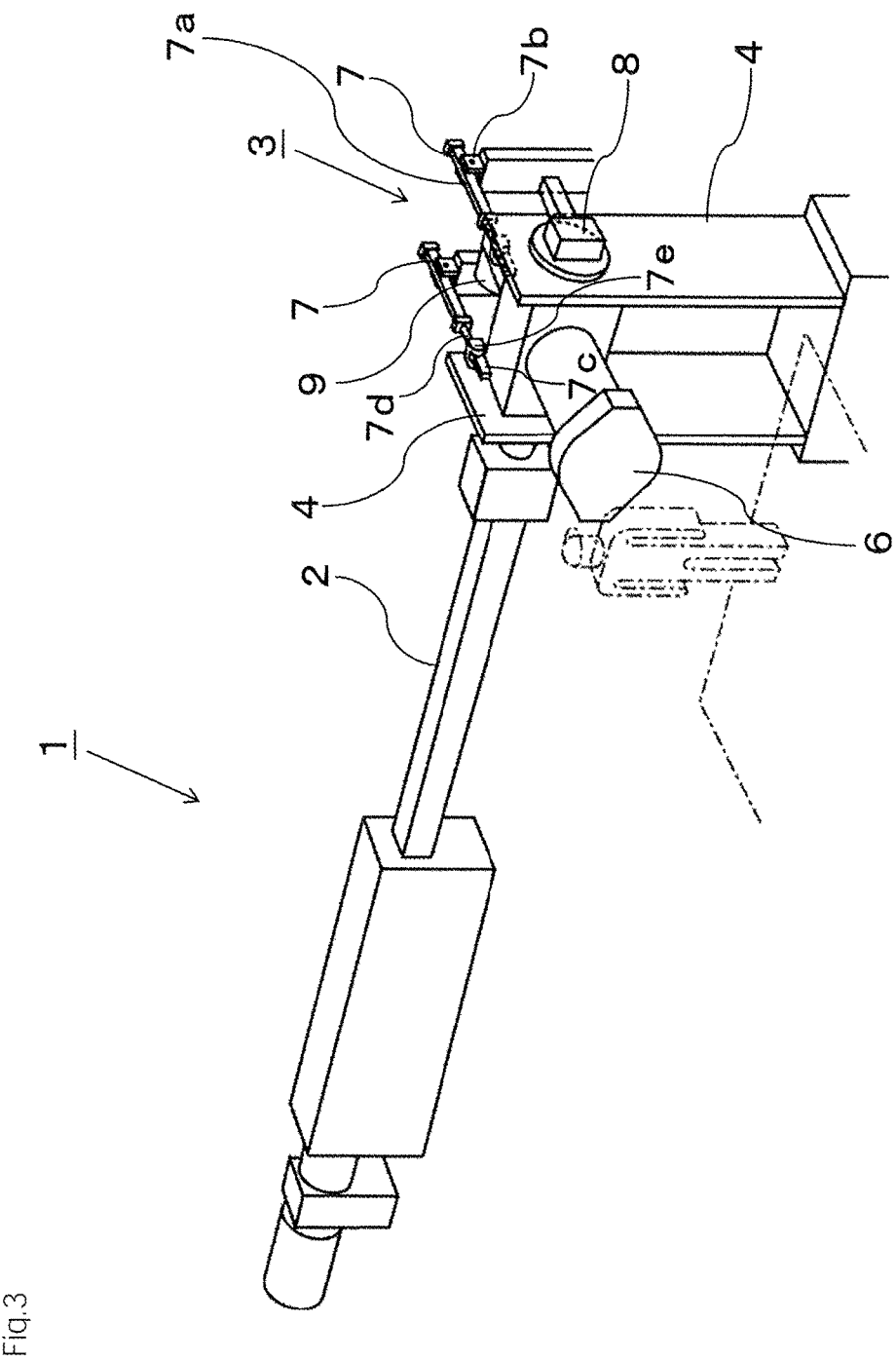
FIG. 3 is an overall perspective view of the continuous extrusion forming apparatus during a changing operation of the mouth piece structure.

As shown in FIG. 1 to FIG. 3, a continuous extrusion forming apparatus 1 of this embodiment comprises a screw which carries a forming raw material in the horizontal direction, the screw being built in the screw part, and also comprises a mouth piece structure 3 for extrusion forming and a mouth piece structure holder 4 which turnably holds the mouth piece structure 3 on the downstream side of a screw part 2.

The mouth piece structure 3 has a horizontal channel 5 for extruding the forming raw material flowing in from the screw part 2 in the horizontal direction, an extrusion channel 10 orthogonal to the horizontal channel 5, and an extrusion port 6 provided at a tip end of the forming raw material extrusion channel 10. The forming raw material flowing in from the screw part 2 is extruded from an extrusion port 6 through an approximately L-shaped channel composed of the horizontal channel 5 and extrusion channel 10.

The mouth piece structure holder 4 is provided with a turning means 7 which freely changes the opening direction of the extrusion port 6 between the horizontal direction and a floor facing direction. In this embodiment, the turning means 7 is driven by a pair of hydraulic cylinders 7a as a drive source. These hydraulic cylinders 7a are supported on a part of the mouth piece structure holder 4 by shaft 7b in such a manner that they can be freely tilted in the vertical direction. The mouth piece structure 3 is provided, at both sides, with arms 7c which extend rearward with respect to the extrusion port 6, and the tip end of a piston rod 7d of each of the hydraulic cylinders 7a is connected to the rear end of the arm 7c via a joint 7e. Therefore, the extension of the piston rod 7d brings the mouth piece structure 3 in a state where the extrusion port 6 is oriented vertically downward as shown in FIG. 1, whereas the retraction thereof rotates the mouth piece structure 3 into a state where the extrusion port 6 is directed horizontal as shown in FIG. 3. The turning means 7 is not limited to this embodiment, and, of course, can employ any structure such as a motor-driven system.

In this embodiment, during extrusion forming, the forming raw material is extruded vertically downward while the opening direction of the extrusion port 6 is the floor facing direction as shown in FIG. 1.

The vertical downward extrusion of the forming raw material is carried out using the continuous extrusion forming apparatus 1 in this manner, thereby enables to continuously form a structure, without deformation, has a size to cause deformation due to its own weight upon horizontal extrusion forming due to its own weight (for example, a honeycomb structure having a diameter of 10 inches or more), and to avoid the problem of "a raw material loss in the seam portions of the forming raw material" as is caused when "ram type" extrusion forming apparatuses are used.

Figure 5:
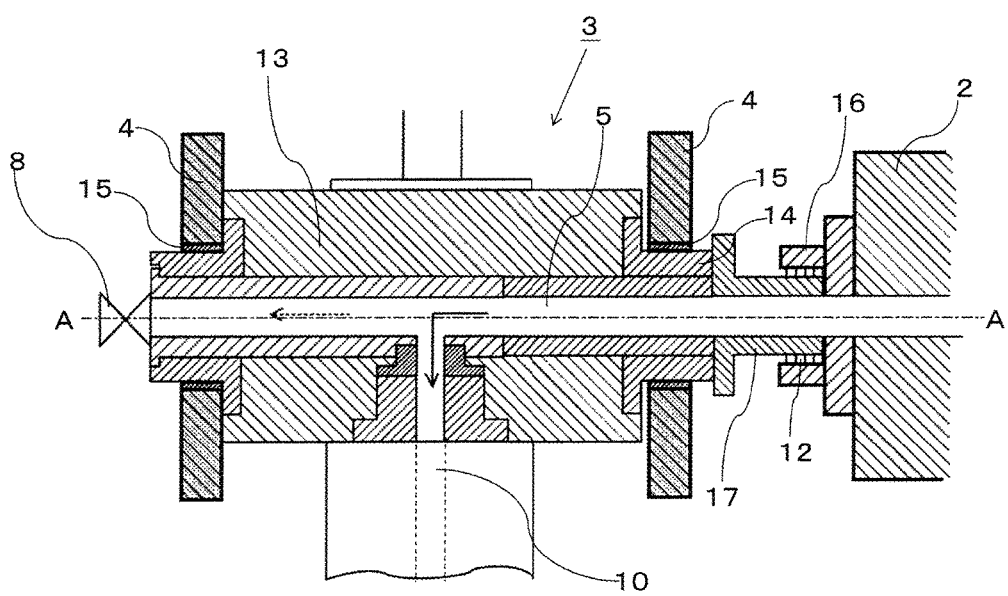
FIG. 5 is a horizontal cross sectional view of the mouth piece structure.

FIG. 5 shows a cross sectional structure of the mouth piece structure 3. Reference numeral 13 denotes a mouth piece structure main body which is square in cross section, and bearing bushes 14 are attached to both the left and right ends thereof. The mouth piece structure main body 13 is tunably supported by a pair of left and right bearings 15 that are provided on the mouth piece structure holder 4. Inside the mouth piece structure main body 13, the horizontal channel 5 described above is provided in a position on the rotation center axis A-A. In the center part of the mouth piece structure main body 3, an extrusion channel 10 which is orthogonal to the horizontal channel 5 is provided. A pressure releasing valve is provided as a pressure releasing device 8 at the tip end of the horizontal channel 5. A driving arm of the turning means 7 described above is coupled to the mouth piece structure main body 13 so that the mouth piece structure main body 13 and extrusion port 6 can be turned around the rotation center axis A-A.

A cylindrical part 16 is formed at a tip end of the screw part 2, and the tip end of a sleeve 17 projected at the end part of the mouth piece structure main body 13 is loaded into this cylindrical part 16. A sealing member 12 is provided over the entire periphery between these cylindrical part 16 and sleeve 17. The sealing member 12 may be an O-ring, but is a gland packing in FIG. 5. When the mouth piece structure main body 13 turns in the above-described manner, the sleeve 17 rotates within the cylindrical part 16. The pressure within the mouth piece structure 3 during extrusion forming is high, specifically, 10 MPa or more, but the sealing member 12 is arranged in a coupling part between the screw part 2 and the forming raw material extrusion channel 5 in this manner so that the internal pressure during extrusion forming can be maintained.

The mouth piece structure 3 of the continuous extrusion forming apparatus needs periodical changing operation, and thus, during the changing operation of the mouth piece structure 3, the turning means 7 is operated so that the opening direction of the extrusion port 6 is directed to the horizontal direction as shown in FIG. 3 by turning the mouth piece structure 3 as shown in FIG. 2.

The mouth piece structure 3 for large products has a weight of about 600 kg including attachment jigs, but can be easily turned by operating the turning means 7. In this embodiment, a balance weight 9 is arranged in a position opposite to the extrusion port 6 for stable turning of the mouth piece structure 3.

Since the pressure within the mouth piece structure 3 during extrusion forming is high, specifically, 10 MPa or more as described above, the turning operation of the mouth piece structure 3 must be carried out after the reduction of the pressure within the mouth piece structure 3. In this embodiment, the mouth piece structure main body 13 is provided with the pressure releasing device 8 as a means for decreasing the internal pressure of an upstream part of the mouth piece structure 3.

Figure 4:
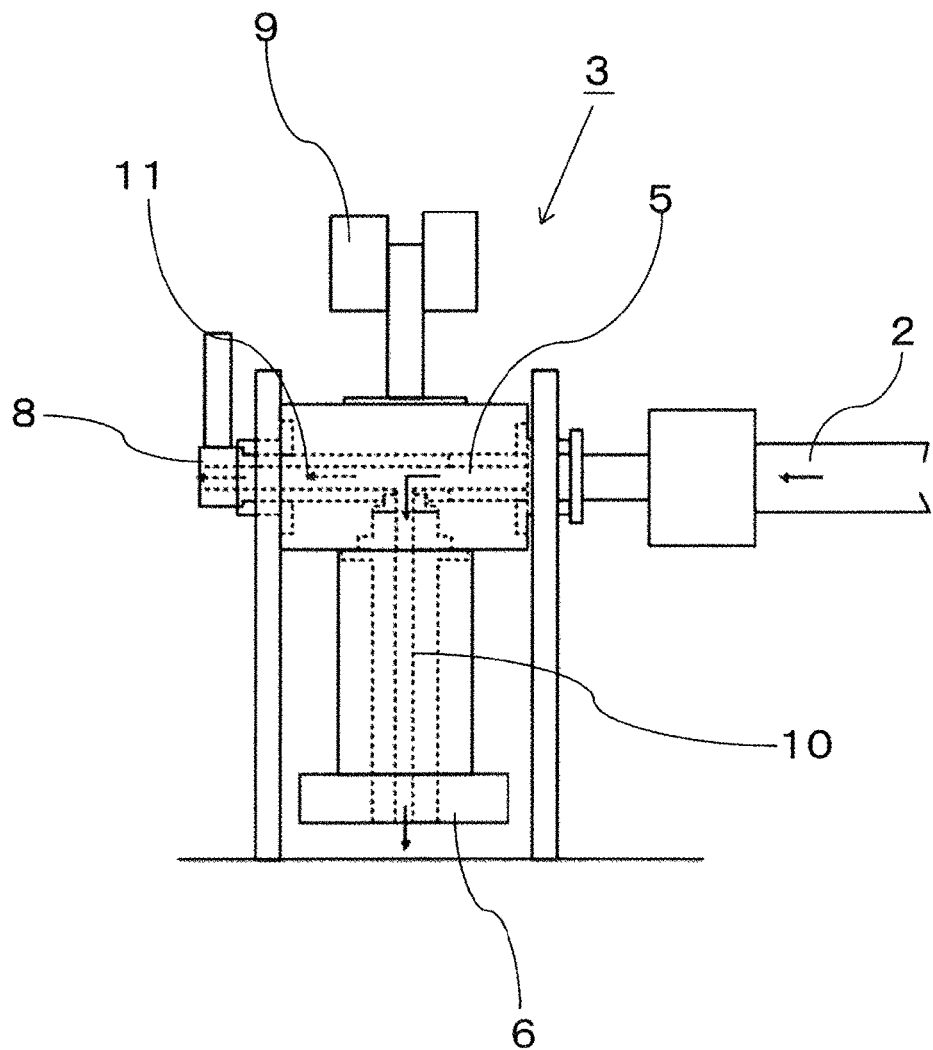
FIG. 4 is an explanatory view of the arrangement of a pressure releasing device.

For effective reduction of the internal pressure, the pressure releasing device 8 is preferably arranged on the extended line of the horizontal channel 5 as shown in FIG. 4 and FIG. 5. Therefore, in this embodiment, the horizontal channel 5 is extended to provide a pressure releasing channel 11, as shown in FIG. 4 and FIG. 5. Since the pressure releasing channel 11 during extrusion forming is filled with so-called "dead soil," the forming raw material pressed into the horizontal channel 5 from the screw part 2 flows into the orthogonal extrusion channel 10 and is extruded from the extrusion port 6.

When the continuous extrusion forming apparatus 1 of the above embodiment was used to produce a honeycomb structure having a diameter of 15 inches, a 15% reduction in production cost was attained, as compared with the case where the problem of "a raw material loss in the seam portions of the forming raw material" was inevitably caused by using a conventional "ram type" extrusion forming apparatus.

REFERENCE SIGNS LIST

1: Continuous extrusion forming apparatus
2: Screw part
3: Mouth piece structure
4: Mouth piece structure holder
5: Horizontal channel
6: Extrusion port
7: Turning means
7a: Hydraulic cylinder
7b: Shaft
7c: Arm
7d: Piston rod
7e: Joint
8: Pressure releasing device
9: Balance weight
10: Extrusion channel
11: Pressure releasing channel
12: Sealing member
13: Mouth piece structure main body
14: Bearing bush
15: Bearing
16: Cylindrical part
17: Sleeve

The invention claimed is:

1. A continuous extrusion forming apparatus comprising: a screw which carries a forming raw material in a horizontal direction, the screw being built in a screw part; and a mouth piece structure for extrusion forming, which is provided on a downstream side of the screw part,
   wherein the mouth piece structure has a horizontal channel for extruding the forming raw material flowing in from the screw in the horizontal direction, an extrusion channel orthogonal to the horizontal channel such that the extrusion channel is in fluid communication with the horizontal channel, and an extrusion port provided at a tip end of the extrusion channel, and
   wherein a mouth piece structure holder, which holds the mouth piece structure, is provided with a turning means, which freely changes an opening direction of the extrusion port between a horizontal direction and a floor facing direction, such that the turning means rotates the opening direction of the tip end of the extrusion channel between the horizontal direction and the floor facing direction with the screw in fluid communication with the horizontal channel.

2. The continuous extrusion forming apparatus according to claim 1, wherein the mouth piece structure is provided with a pressure releasing device as a means for reducing the internal pressure of a mouth piece structure upstream part before the turning operation.

3. The continuous extrusion forming apparatus according to claim 2, wherein the pressure releasing device is arranged on an extended line of the horizontal channel.

4. A method for producing a honeycomb structure using the continuous extrusion forming apparatus according to claim 1,
   wherein the forming raw material is extruded in a state where the opening direction of the extrusion port is oriented vertically downward, and
   wherein a changing operation of the mouth piece structure is carried out in a state where the opening direction of the extrusion port is the horizontal direction.

* * * * *